US006472077B1

(12) United States Patent
Cretekos et al.

(10) Patent No.: US 6,472,077 B1
(45) Date of Patent: *Oct. 29, 2002

(54) BLOCK-RESISTANT FILM

(75) Inventors: George F. Cretekos, Farmington, NY (US); John R. Wagner, Jr., Rochester, NY (US)

(73) Assignee: Exxon Mobil Oil Corporation, Fairfax, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/467,170

(22) Filed: Dec. 20, 1999

(51) Int. Cl.⁷ ............................................. B32B 27/32
(52) U.S. Cl. ................... 428/447; 428/451; 428/500; 428/515; 428/516
(58) Field of Search ................ 428/515, 516, 428/451, 447, 500

(56) References Cited

U.S. PATENT DOCUMENTS

| 3,865,897 A | * | 2/1975 | Falender et al. ............. 525/100 |
| 4,692,379 A | | 9/1987 | Keung et al. ................ 428/349 |
| 4,769,418 A | | 9/1988 | Mizuno et al. ............. 525/106 |
| 4,978,436 A | | 12/1990 | Kelly ......................... 204/165 |
| 5,169,900 A | | 12/1992 | Gudelis ...................... 525/106 |
| 5,441,802 A | * | 8/1995 | Mizuno et al. ............. 428/327 |
| 5,443,915 A | | 8/1995 | Wilkie et al. ................ 428/461 |
| 5,466,734 A | | 11/1995 | Catena et al. ............... 524/230 |
| 5,474,820 A | * | 12/1995 | Murschall et al. ......... 428/35.7 |
| 5,482,780 A | | 1/1996 | Wilkie et al. ................ 428/515 |
| 5,489,473 A | | 2/1996 | Wilkie ........................ 428/323 |
| 5,616,400 A | | 4/1997 | Zhang ........................ 428/195 |
| 5,708,085 A | * | 1/1998 | Hauenstein et al. ......... 525/106 |
| 5,789,473 A | * | 8/1998 | Hauenstein et al. ......... 525/265 |
| 5,792,549 A | | 8/1998 | Wilkie ........................ 428/215 |
| 5,798,174 A | | 8/1998 | Wilkie ........................ 428/347 |
| 5,986,003 A | * | 11/1999 | Lee et al. .................... 525/104 |
| 6,074,762 A | * | 6/2000 | Cretekos et al. ............. 428/516 |
| 6,080,489 A | * | 6/2000 | Mehta ........................ 428/447 |
| 6,322,894 B1 | * | 11/2001 | Harley et al. ................ 428/447 |

FOREIGN PATENT DOCUMENTS

JP    2-60745 A    *   3/1990

* cited by examiner

*Primary Examiner*—Paul Thibodeau
*Assistant Examiner*—Monique R. Jackson
(74) *Attorney, Agent, or Firm*—Rick F. James

(57) ABSTRACT

A block-resistant film is described which comprises a core layer of a thermoplastic polymer having a first side and a second side; a functional layer which is printable or sealable or treatable for printing or sealing is on the first side of the core layer, and a block-resistant layer is on the second side of the core layer. The block-resistant layer comprises a thermoplastic polymer and an amount of a polydialkylsiloxane, based upon the entire weight of the block-resistant layer, sufficient to inhibit blocking of the block-resistant layer to the functional layer when they are in contact. The surface of the block-resistant layer is flame treated or corona treated.

11 Claims, No Drawings

BLOCK-RESISTANT FILM

FIELD OF THE INVENTION

The invention relates to a block-resistant film. More precisely, the invention relates to a multilayer film having a core layer and a block-resistant layer which inhibits blocking to a functional layer of the film which is printable or sealable or treatable for sealing or printing.

BACKGROUND OF THE INVENTION

Blocking is the unwanted adhesion between layers of plastic film that may occur under pressure, usually during storage or use. It is known that blocking can be prevented with the use of antiblocking agents which are added to the composition which makes-up the surface layer of the film. Known antiblocking additives for plastic packaging film include synthetic waxes. In U.S. Pat. No. 4,692,379, various antiblocking agents for a heat sealable outer skin of a multilayer film are specifically described, including silica, clay, talc and glass.

Sealable coatings are used on flexible packaging films so that the films can be sealed with the application of pressure, with or without out exposure to elevated temperatures. These so called "cold seal" coatings can pose blocking problems. A typical cold seal coating is a natural or synthetic rubber latex combined with a soft polymer which tends to be tacky at room temperature and causes blocking. The rubber component permits sealing with slight pressure and without using heat. The cold seal coating is usually applied to a plastic film as it is wound into a roll. Since the cold seal coatings are tacky, it is important that the backside of the film which contacts the cold seal coating upon winding does not stick (block) to the cold seal coating so that the film can be easily unwound for use on packaging equipment.

One approach for reduced blocking between the cold seal coating and the backside of the film has been to formulate a cold seal coating which is nonblocking to certain surfaces including polypropylene, such a cold seal formulation is described in U.S. Pat. No. 5,616,400.

Another approach uses a cold seal release material on the layer opposite the cold seal surface. See U.S. Pat. Nos. 5,482,780; 5,489,473 and 5,466,734.

In U.S. Pat. No. 4,692,379, a film is described which has an upper heat sealable layer formed from an ethylene-propylene-containing copolymer or terpolymer and an antiblocking agent, the lower heat sealable layer is formed from an ethylene-propylene-containing copolymer or terpolymer and antiblocking agent and a quantity of silicone oil such that the coefficient of friction-reducing amount of the silicone oil will be present on an exposed surface of the upper heat sealable layer following mutual contact of the upper and lower surfaces. The silicone oil additive is described as having a viscosity of from about 350 to about 100,000 centistokes with about 10,000 to about 30,000 centistokes being preferred. An advantage of the invention as described in the '379 patent is that the silicone is present on the exposed surface of the lower layer in discrete microglobules which, to some extent, transfer to the upper surface upon contact. The silicone on the surfaces of the film facilitates machinability.

An attempt was made to produce a block-resistant functional film, typically a film having a printing function or sealing function, with silicone oil in a surface layer as an antiblocking agent. It was found that the silicone oil was detrimental to the printing or sealing function.

Copending U.S. application Ser. No. 09/026,454, U.S. Pat. No. 6,074,762 filed Feb. 19, 1998, describes a multilayer film having a core layer and a block-resistant layer which inhibits blocking to a functional layer of the film which is printable or sealable or treatable for sealing or printing. The block-resistant layer includes polydialkylsiloxane, preferably in small quantities. When the film is wound into a roll, polydialkylsiloxane deposits silicone onto the functional layer but the amount of silicone deposited is not substantially detrimental to the printing function or the sealing function.

SUMMARY OF THE INVENTION

The invention is directed to a block-resistant film, comprising:

(a) a core layer of a thermoplastic polymer, the core layer having a first side and a second side, (b) a functional layer which is printable or sealable or treatable for printing or sealing on the first side of the core layer, and (c) a block-resistant layer on the second side of the core layer comprising a thermoplastic polymer and an amount of a polydialkylsiloxane, based upon the entire weight of the block-resistant layer, sufficient to inhibit blocking of the block-resistant layer to the functional layer when they are in contact, wherein the surface of said block-resistant layer is flame treated or corona treated.

It is a feature of the invention to have a block-resistant layer which comprises a thermoplastic polymer and an amount of a polydialkylsiloxane sufficient to inhibit blocking of the block-resistant layer to the functional layer which happens when the film is wound into a roll or stacked so that the functional layer is in contact with the block-resistant layer.

It is an advantage of the invention that when the film is wound into a roll or stacked for storage in such a manner that the functional layer is in contact with the block-resistant layer of the film, the block-resistant layer, made with the polydialkylsiloxane described herein, deposits less silicone onto the functional layer than the silicone oil described in U.S. Pat. No. 4,692,379 such that with the instant invention the printing or sealing function is not substantially impaired.

DETAILED DESCRIPTION OF THE INVENTION

The block-resistant film of the instant invention is resistant to the undesirable adhesion between an exposed surface of the first side of the film to an exposed surface of a second side of the film which adhesion develops under pressure, typically, during storage or use.

The block-resistant layer of the instant invention is made with a particular polydialkylsiloxane additive. The polydialkylsiloxane additive is especially selected because it inhibits blocking and does not tend, in an amount detrimental to the functional properties of the film, to appear on the surface of the block-resistant layer or the functional layer. The appearance of the polydialkysiloxane may be determined by measuring the amount of silicon on the film surface by Electron Spectroscopy for Chemical Analysis (ESCA). It has been found that when a functional layer which is printable or sealable or treated for printing or sealing, contacts a layer which is compounded with a polydialkylsiloxane, of the kind described in U.S. Pat. No. 4,692,379, that polydialkylsiloxane (silicone oil) appears on the surface of both the functional layer and the block-resistant layer, after contact of the functional layer to the block-resistant layer (by measuring the amount of silicone), to an extent which is considered detrimental to the printability or sealability of the functional layer.

The core layer comprises a film-forming thermoplastic polymer which has properties suitable for extrusion or coextrusion followed by biaxial orientation in the machine and transverse directions under elevated temperature so as to form a film. Although, preferably, the thermoplastic polymer of the core layer is a propylene homopolymer, it can be any polymer made from a 2 to 4 carbon atom olefin, such as ethylene or butene-1 or a polymer made predominantly of propylene with a minor amounts of another olefin, usually a 2 to 4 carbon atom olefin.

The layer which is block-resistant and the functional layer may be the same or different. The block-resistant layer and the functional layer comprise a film-forming polymer having properties suitable for extrusion and uniaxial or biaxial orientation (by stretching the extrudate in the machine direction and/or transverse direction under elevated temperatures) and for forming skin layers on the outer surfaces of the core layer. Such layers may comprise a thermoplastic polymer composed predominantly of an olefinic polymer such as polypropylene or polyethylene. A blend of polymers may also be used to form these layers.

The block-resistant layer may comprise a predominant proportion of propylene or ethylene and may contain a minor amount of another olefinic monomer having 2 to 8 carbon atoms. The block resistant layer may comprise a propylene homopolymer, ethylene homopolymer, copolymer of ethylene and propylene or a terpolymer of ethylene, propylene and butene-1.

The thermoplastic polymer of the functional layer may be the same as the thermoplastic polymer of the block-resistant layer or it may be different. Examples of particular polymers of the functional layer include copolymers or terpolymers of ethylene, propylene and butylene or another olefin having 5 to 10 carbon atoms or a mixture of these olefin polymers. When it is desirable for this layer to be printable or sealable or treatable for printing or sealing, it may comprise an ethylene homopolymer having a density of about 0.91 to about 0.96 g/cm$^3$, ethylene-propylene copolymer in which the ethylene content is about 2 to 10% by weight based upon the total weight of the copolymer or an ethylene-propylene-butene-1 terpolymer which has about 0.5 to about 7 weight % ethylene and about 5 to about 30 weight % butylene, each based upon the total weight of the terpolymer.

The block-resistant layer is compounded with an amount of a polydialkylsiloxane sufficient to inhibit blocking of the block-resistant layer to the functional layer when the layers are in contact so that the layers can be easily separated. Such blocking characteristics are beneficial in high speed machinery, e.g., packaging machinery and printing machinery. Although analysis by electron spectroscopy may reveal that silicone from the polydialkylsiloxane is present on the surface of both the block-resistant layer and the functional layer, the amount is preferably not substantially detrimental to the printing function or sealing function of the film. For example, on winding the film into a roll for storage so that the external surface of the block-resistant layer contacts the external surface of the functional layer, the polydialkylsiloxane incorporated into the block-resistant layer has less tendency to transfer to the functional layer than the silicone oil described in U.S. Pat. No. 4,692,379. This tendency was determined by measuring the silicone present on the surfaces of the block-resistant layer and the functional layer by electron spectroscopy after the roll was unwound, as described in copending U.S. application Ser. No. 09/026,454, filed Feb. 19, 1998. U.S. Pat. No. 6,074,762.

The polydialkylsiloxane of this invention can have a number average molecular weight above about 250,000, typically above about 300,000 and a viscosity of above about 10,000,000 cSt, usually ranging from about 15,000,000 to about 20,000,000 cSt.

The alkyl group of the polydialkylsiloxane usually ranges from 1 to about 10 carbon atoms, more usually from 1 to about 3 carbon atoms, which carbon atoms can be in a straight or branched chain configuration.

One particular kind of polydialkylsiloxane used in this invention is referred to as "silicone gum", also described as an "ultra high molecular weight silicone". Silicone gum can be in the form of a silicone polymer dispersed in polypropylene or polyethylene. Silicone gum of this kind is available in a masterbatch form from the Dow Corning Corporation, of Midland Michigan, under the product designations "MB50-001" and "MB50-002".

The ratio of polydialkylsiloxane to polyolefin in the block-resistant layer is sufficient to inhibit blocking of the block-resistant layer to the functional layer when the layers are in contact as would happen when the film is wound into a roll. The ratio of the polydialkylsiloxane to the polyolefin will vary, for example, depending upon the nature of the polydialkylsiloxane and the nature of the olefinic component. As an example of a broad range, the polydialkylsiloxane content may range from about 1 to about 10 weight percent. In certain situations, fairly high polydialkylsiloxane contents, such as about 2 to about 10, or even about 5 to about 10, weight percent based on the total weight of the block-resistant layer, are preferred. By way of contrast, the preferred polydialkylsiloxane content in copending U.S. application Ser. No. 09/026,454, U.S. Pat. No. 6,074,762 filed Feb. 19, 1998, is between about 0.05 and about 1 weight percent based on the total weight of the block-resistant layer.

The functional layer includes those thermoplastic polymer skin layers suitable for being treated for printing or sealing or by being a thermoplastic polymer which is printable or sealable without treatment. In this regard, the functional layer may be selected from the group consisting of ethylene or propylene homopolymer, ethylene-propylene copolymer or ethylene-propylene terpolymer or a mixture of two or more of such homopolymer, copolymer or terpolymer. In one embodiment of the invention, the surface of the functional layer is treated by surface treatment which improves wettability and adhesion of printed matter (print may be by lithography, liquid or dry toner, thermal dye, dye sublimation, etc.). In another embodiment of the invention, the functional layer is a cold seal adhesion promoting layer.

It is contemplated that the block-inhibiting layer will provide excellent antiblocking properties to any commercially applied cold seal receptive composition or print receptive surface.

The functional layer may itself be printable or sealable or may be treated so as to provide sealability and/or printability. This includes surface treatment of any kind known to enhance the surface tension properties such as flame or corona treatment. Other treatment methods include the application of a printable or sealable covering layer by any means including conventional extrusion or coating. Certain water based coatings are known for their utility as cold-sealable coatings or printable coatings. Examples include acrylic-based coatings including alkyl acrylate polymers and copolymers.

Sometimes it is useful to enhance film properties or provide the film with certain properties by use of appropriate film additives. Such additives are used in effective amounts, which vary depending upon the property required, and may be selected from the group consisting of: antiblock, slip additive, antioxidant additive, moisture barrier additive or gas barrier additive.

Antistatic additives may be used in amounts ranging from about 0.05 to about 3 weight %, based upon the weight of the layer. Such antistatic additives include alkali metal sulfonates, polyether-modified polydiorganosiloxanes, polyalkylphenylsiloxanes and tertiary amines.

Antiblock additives used in amounts ranging from about 0.1 weight % to about 3 weight % based upon the entire weight of the layer. Such additives include inorganic particulates such as silicon dioxide, e.g., a particulate antiblock sold by W.R. Grace under the trademark "Sipernat 44", calcium carbonate, magnesium silicate, aluminum silicate, calcium phosphate, and the like, e.g., Kaopolite. Another useful particulate antiblock agent is referred to as a non-meltable crosslinked silicone resin powder sold under the trademark "Tospearl" made by Toshiba Silicone Co., Ltd. and is described in U.S. Pat. No. 4,769,418. Another useful antiblock additive is a spherical particle made from methyl methacrylate resin having an average diameter of 1 to 15 microns, such an additive is sold under the trademark "Epostar" and is commercially available from Nippon Shokubai. Experimental results referred to in copending U.S. application Ser. No. 09/026,454, filed Feb. 19, 1998, U.S. Pat. No. 6,074,762 indicate that with addition of particulate antiblock additives such as Epostar MA1010, T145, Kaopolite 1152, Sipernat 44 do not materially effect antiblock properties of the block-resistant layer formulated in accordance with this invention but do reduce the coefficient of friction properties of the film.

Slip additives include higher aliphatic acid amides, higher aliphatic acid esters, waxes and metal soaps. Such slip additives may be used in amounts ranging from about 0.1 to about 2 weight percent based on the total weight of the layer. A specific example of a fatty amide slip additive is erucamide.

Antioxidants may be used in amounts ranging from about 0.1 weight % to about 2 weight percent, based on the total weight of the layer, phenolic antioxidants. One useful antioxidant is commercially available under the trademark "Irganox 1010".

Barrier additives may be used in useful amounts and may include low-molecular weight resins, hydrocarbon resins, particularly petroleum resins, styrene resins, cyclopentadiene resins and terpene resins.

Optionally, the outer layers may be compounded with a wax for lubricity. Amounts of wax range from about 2 to about 15 weight % based on the total weight of the layer.

The process of making the block-resistant layer can be by masterbatch in which a minor proportion of a concentrated composition of polydialkylsiloxane and the thermoplastic polymer, along with any optional additives is prepared and mixed (for example, by dry mixing or melt compounding) into a major proportion of a thermoplastic polymer. The amount of concentrate in the masterbatch usually ranges from about 5% by weight to about 50% by weight based on the total weight of the block resistant layer. The mixture is then melt mixed in an extruder or compounded in a twin screw extruder. Alternatively, the block resistant layer is prepared in one step by mixing the thermoplastic polymer, polydialkylsiloxane and, optionally, any additives in the proportions used for making up the final skin composition.

The film may be formed by coextruding the thermoplastic polymer core layer together with the block-inhibiting layer and functional layer through a flat sheet extruder die at a temperature ranging from between about 200 to about 250° C., casting the film onto a cooling drum and quenching the film. The sheet is then stretched about 3 to about 7 times in the machine direction (MD) orienter followed by stretching about 5 to about 10 times in the transverse direction (TD) orienter. The film is then wound onto a reel. The external surface of the block-resistant layer and, optionally, the functional layer is flame treated or corona treated before winding. A suitable coating may be applied to the functional layer.

In general, the film of the instant invention may comprise at least three layers: the core layer; the block-resistant layer (an outermost skin layer); and the layer which is functional (an outermost skin later). It is contemplated that additional layers can be incorporated between the core layer and the outermost skin layers, e.g., tie layers comprising polypropylene or polyethylene. The core layer usually represents about 70 to about 90 percent of the thickness of the total film. The skin layers are usually coextensively applied to each major surface of the core layer, typically by coextrusion, as noted above.

INVENTION EXAMPLES AND COMPARATIVE EXAMPLES

In each of the Examples and Comparative Examples, the antiblock performance of the described film samples was tested by placing the block-resistant surface against a cold seal surface coating (Technical Coatings product "30061A"). According to one test, these surfaces were pressed together for seventy-two hours at 100 psi (689.5 kPa) and room temperature, about 72° F. (22° C.). According to another test, these surfaces were pressed together for twenty-four hours at 100 psi (689.5 kPa) and a temperature of about 100° F. (38° C.). The block force reported below was measured by peeling the layers apart in an Instron brand tester which reported the peel force in grams per inch (g/25mm).

Comparative Example 1

A coextruded biaxially oriented three layer film was made by a masterbatch method having a core layer, of about 18.8 microns thickness, of polypropylene (commercially available from Fina under the product designation "3371") with upper and lower skin layers. The upper layer was about 0.6 microns in thickness and was made from a high crystallinity polypropylene (Amoco 9218, available from Amoco Chemical Co. of Chicago, Ill.) twin screw compounded with 1.6 wt % of a non-migratory particulate crosslinked hydrocarbyl-substituted polysiloxane slip agent "KMP-590" sold by Shin Etsu. The lower layer was a high density polyethylene (M-6030, available from Lyondell Chemical Company) of about 0.6 microns thickness. Both of the upper and lower layers were flame treated to a level of 40-50 dynes. The films were wound into a roll and the samples were tested for blocking to a cold sealable coating.

The results of antiblock performance tests are given in Table 1.

Comparative Example 2

Comparative Example 1 was repeated except that the upper layer was not flame treated.

The results of antiblock performance tests are given in Table 1.

Example 3

Comparative Example 1 was repeated except that the upper layer was further compounded with 5 wt % of an ultra high molecular weight silicone (commercially available from Dow Corning under the product designation "MB50-001").

The results of antiblock performance tests are given in Table 1.

Comparative Example 4

Example 3 was repeated except that the upper layer was not flame treated.

The results of antiblock performance tests are given in Table 1.

TABLE 1

| Ex. No. | Resin Base (Amoco) | MB type | Silicone (wt %) | Treatment | 72 hr, 100 psi, ambient (g/in) | 24 hr, 100 psi, 100° F. (g/in) |
|---|---|---|---|---|---|---|
| 1 | 9218 | 50-001 | 0 | Flame | 69.4 | 58.4 |
| 2 | 9218 | 50-001 | 0 | None | 44.2 | 46.7 |
| 3 | 9218 | 50-001 | 5 | Flame | 38.0 | 52.2 |
| 4 | 9218 | 50-001 | 5 | None | 62.7 | 62.5 |

A comparison of the results for Comparative Examples 1 and 2 shows that, in the absence of a silicone modifier, flame treatment increases the release force. Surprisingly, however, as shown by Examples 3 and 4, flame treatment reduces the release force, when a silicone modifier is included in the upper layer.

Comparative Example 5

Comparative Example 1 was repeated except that Exxon 4612 was substituted for Amoco 9218. Exxon 4612 is a polypropylene available from Exxon Chemical Co. of Houston, Tex. Comparative Example 5 was also different from Comparative Example 1, in that the upper layer in Comparative Example 5 was further compounded with 0.75 wt % of an ultra high molecular weight silicone (commercially available from Dow Corning under the product designation "MB50-001").

The results of antiblock performance tests are given in Table 2.

Comparative Example 6

Comparative Example 5 was repeated except that the upper layer was not flame treated.

The results of antiblock performance tests are given in Table 2.

TABLE 2

| Ex. No. | Resin Base (Exxon) | MB type | Silicone (wt %) | Treatment | 72 hr, 100 psi, ambient (g/in) | 24 hr, 100 psi, 100° F. (g/in) |
|---|---|---|---|---|---|---|
| 5 | 4612 | 50-001 | 0.75 | Flame | 51.0 | 62.8 |
| 6 | 4612 | 50-001 | 0.75 | None | 45.4 | 52.1 |

The results of Table 2 show that, when Exxon 4612 is used in the upper layer and only a relatively small amount (i.e. 0.75 wt %) of MB50-001 silicone is used in the upper layer, flame treatment does not reduce the release force.

Comparative Example 7

Comparative Example 1 was repeated except that M-6030 was substituted for Amoco 9218. M-6030 is a high density polyethylene (HDPE) available from Lyondell Chemical Company.

The results of antiblock performance tests are given in Table 3.

Comparative Example 8

Comparative Example 7 was repeated except that the upper layer was not flame treated.

The results of antiblock performance tests are given in Table 3.

Example 9

Comparative Example 7 was repeated except that the upper layer was further compounded with 10 wt % of an ultra high molecular weight silicone (commercially available from Dow Corning under the product designation "MB50-002").

The results of antiblock performance tests are given in Table 3.

Comparative Example 10

Example 9 was repeated except that the upper layer was not flame treated.

The results of antiblock performance tests are given in Table 3.

TABLE 3

| Ex. No. | Resin Base (Lyondell) | MB type | Silicone (wt %) | Treatment | 72 hr, 100 psi, ambient (g/in) | 24 hr, 100 psi, 100° F. (g/in) |
|---|---|---|---|---|---|---|
| 7 | 6030 | 50-002 | 0 | Flame | 70.5 | 93.5 |
| 8 | 6030 | 50-002 | 0 | None | 62.8 | 58.7 |
| 9 | 6030 | 50-002 | 10 | Flame | 7.2 | 10.1 |
| 10 | 6030 | 50-002 | 10 | None | 41.5 | 47.1 |

The results of Table 3 show that the combination of flame treatment with the silicone modifier in HDPE substantially reduces release forces.

Example 11

Comparative Example 1 was repeated with the following exceptions: (1) the upper layer was further compounded with 1 wt % of an ultra high molecular weight silicone (commercially available from Dow Corning under the product designation "MB50-001"); (2) the upper layer was treated by corona discharge, instead of flame; and (3) a polymer blend was substituted for Amoco 9218. The polymer blend was a blend of 50% by weight of a HDPE with about 50% by weight of a conventional ethylene-propylene-butene-1 terpolymer. Specifically, the HDPE had a melting point of about 132 to about 134° C., a melt index of about 0.1 to 0.2 g/10 minutes, and a density of about 0.955 g/cm$^3$. The ethylene-propylene-butene-1 terpolymer mainly comprised propylene units with about 10% by weight or less of ethylene and 10% by weight or less of butene-1, and had a melting point of about 122 to about 126° C. This blend resulted in the upper layer having a matte appearance.

The results of antiblock performance tests are given in Table 4.

Comparative Example 12

Example 11 was repeated except that the upper layer was not treated by corona discharge.

The results of antiblock performance tests are given in Table 4.

Comparative Example 13

Comparative Example 12 was repeated except that the upper layer did not include the silicone modifier (MB50-001).

The results of antiblock performance tests are given in Table 4.

TABLE 4

| Ex. No. | Resin Base | MB type | Silicone (wt %) | Treatment | 72 hr, 100 psi, ambient (g/in) | 24 hr, 100 psi, 100° F. (g/in) |
|---|---|---|---|---|---|---|
| 11 | Blend | 50-001 | 1 | Corona | 30.9 | 42.6 |
| 12 | Blend | 50-001 | 1 | None | 171.1 | 127.7 |
| 13 | Blend | 50-001 | 0 | None | Blocked | Blocked |

The results of Table 4 show a considerable reduction in release force, when a silicone modifier is included in the upper layer and the upper layer is treated by corona discharge.

What is claimed is:

1. A block-resistant film, comprising:
   (a) a core layer of a thermoplastic polymer, the core layer having a first side and a second side, and the thermoplastic polymer of the core layer being selected from the group consisting of propylene homopolymer, butene-1, propylene-ethylene copolymer, and propylene-butene-1 copolymer;
   (b) a functional layer which is printable or sealable or treatable for printing or sealing on the first side of the core layer, the functional layer comprising a film-forming polymer selected from the group consisting of (i) a homopolymer of ethylene or propylene, (ii) a copolymer of ethylene, propylene, butylene, or an olefin having from 5 to 10 carbon atoms, (iii) a terpolymer of ethylene, propylene, butylene, or an olefin having from 5 to 10 carbon atoms, and (iv) a blend thereof; and
   (c) a block-resistant layer on the second side of the core layer comprising a thermoplastic polymer and an amount of from 1 to about 10 wt %, based upon the entire weight of the block-resistant layer, of a polydialkylsiloxane having a number average molecular weight greater than about 250,000, the amount of polydialkylsiloxane being sufficient to inhibit blocking of the block-resistant layer to the functional layer when they are in contact, and the thermoplastic polymer of the block-resistant layer being selected from the group consisting of propylene homopolymer, ethylene homopolymer, a copolymer of propylene and an olefin having either 2 carbon atoms or from 4 to 8 carbon atoms, a copolymer of ethylene and an olefin having from 3 to 8 carbon atoms, ethylene-propylene-butene-1 terpolymer, and blends thereof, wherein an external surface of said block-resistant layer is flame treated or corona treated.

2. The block-resistant film as claimed in claim 1 in which the thermoplastic polymer of the core layer is a propylene polymer.

3. The block-resistant film as claimed in claim 1 in which the amount of the polydialkylsiloxane ranges from about 2 to about 10 weight percent based on the entire weight of the block resistant layer.

4. The block-resistant film as claimed in claim 1 in which the polydialkylsiloxane has a viscosity above about 10,000,000 centistokes.

5. The block-resistant film as claimed in claim 1 in which the block resistant layer comprises high density polyethylene (HDPE).

6. The block-resistant film as claimed in claim 1 in which the block resistant layer is polypropylene or polyethylene and the functional layer is polypropylene or polyethylene, or ethylene-propylene copolymer or ethylene-propylene-butene-1 terpolymer or a mixture of two or more of the foregoing homopolymer, copolymer or terpolymer.

7. The block-resistant film as claimed in claim 1 in which the block resistant layer has a matte appearance.

8. The block-resistant film as claimed in claim 7 in which the block resistant layer comprises a blend of high density polyethylene (HDPE) with an ethylene-propylene-butene-1 terpolymer.

9. The block-resistant film as claimed in claim 1, in which the polydialkylsiloxane has a viscosity of from about 15,000,000 to 20,000,000 centistokes.

10. The block-resistant film as claimed in claim 1, in which the amount of the polydialkylsiloxane ranges from about 5 to about 10 wt % based on the entire weight of the block resistant layer.

11. A block-resistant film, comprising:
    (a) a core layer of a thermoplastic polymer, the core layer having a first side and a second side, and the thermoplastic polymer of the core layer being selected from the group consisting of propylene homopolymer, butene-1, propylene-ethylene copolymer, and propylene-butene-1 copolymer;
    (b) a functional layer which is printable or sealable or treatable for printing or sealing on the first side of the core layer, the functional layer comprising a film-forming polymer selected from the group consisting of (i) a homopolymer of ethylene or propylene, (ii) a copolymer of ethylene, propylene, butylene, or an olefin having from 5 to 10 carbon atoms, (iii) a terpolymer of ethylene, propylene, butylene, or an olefin having from 5 to 10 carbon atoms, and (iv) a blend thereof; and
    (c) a block-resistant layer on the second side of the core layer comprising a thermoplastic polymer and an amount of from 1 to about 10 wt %, based upon the entire weight of the block-resistant layer, of a polydialkylsiloxane, the amount of polydialkylsiloxane being sufficient to inhibit blocking of the block-resistant layer to the functional layer when they are in contact, and the thermoplastic polymer of the block-resistant layer being selected from the group consisting of propylene homopolymer, ethylene homopolymer, a copolymer of propylene and an olefin having either 2 carbon atoms or from 4 to 8 carbon atoms, a copolymer of ethylene and an olefin having from 3 to 8 carbon atoms, ethylene-propylene-butene-1 terpolymer, and blends thereof;
    wherein an external surface of the block-resistant layer is flame treated or corona treated, and further wherein less release force is required to peel the block resistant layer of the block resistant film from a cold seal surface coating in comparison to an identical block resistant film that lacks (i) from 1 to about 10 wt % of polydialkylsiloxane in a block resistant layer and/or (ii) a flame treated or corona treated external surface of a block resistant layer.

* * * * *